United States Patent
Missenti et al.

(10) Patent No.: US 12,404,118 B2
(45) Date of Patent: Sep. 2, 2025

(54) MACHINE FOR SEPARATING PACKAGINGS

(71) Applicant: Swisslog Healthcare AG, Buchs (CH)

(72) Inventors: Adriano Missenti, Villar San Costanzo (IT); Maurizio Chesta, Dronero (IT); Federico Rossi, Morozzo (IT)

(73) Assignee: SWISSLOG HEALTHCARE AG, Buchs (CH)

( * ) Notice: Subject to any disclaimer, the term of this patent is extended or adjusted under 35 U.S.C. 154(b) by 175 days.

(21) Appl. No.: 18/345,048

(22) Filed: Jun. 30, 2023

(65) Prior Publication Data
US 2024/0002168 A1 Jan. 4, 2024

(30) Foreign Application Priority Data

Jul. 1, 2022 (IT) .................. 102022000014002

(51) Int. Cl.
*B65G 47/31* (2006.01)
(52) U.S. Cl.
CPC .................... *B65G 47/31* (2013.01)
(58) Field of Classification Search
CPC .................................... B65G 47/31
USPC ..................................... 198/461.3
See application file for complete search history.

(56) References Cited

U.S. PATENT DOCUMENTS

| | | | |
|---|---|---|---|
| 2,609,912 A | 9/1952 | Engel | |
| 2,777,167 A | 1/1957 | Knoth | |
| 5,628,408 A | 5/1997 | Planke et al. | |
| 5,740,899 A * | 4/1998 | Pugh | B65G 47/1457 198/443 |
| 6,328,151 B1 * | 12/2001 | Spangenberg | B65G 21/2063 198/452 |
| 8,973,733 B2 * | 3/2015 | Fredrickson | B65B 35/56 198/395 |

FOREIGN PATENT DOCUMENTS

| | | | |
|---|---|---|---|
| EP | 255261 | * | 2/1988 |
| FR | 1188349 | | 9/1959 |

OTHER PUBLICATIONS

Italian Search Report and Written Opinion issued in corresponding Italian Application No. 102022000014002 with partial English translation, date of mailing Feb. 8, 2023 (8 pages).

\* cited by examiner

*Primary Examiner* — Gene O Crawford
*Assistant Examiner* — Lester Rushin, III
(74) *Attorney, Agent, or Firm* — FLYNN THIEL, P.C.

(57) ABSTRACT

A machine for separating packagings includes a transport belt which is inclined longitudinally at a first angle and laterally at a second angle so that a first longitudinal side is positioned higher than a second longitudinal side. The transport belt is further provided with a plurality of flights which are arranged near the second longitudinal side.

15 Claims, 5 Drawing Sheets

MACHINE FOR SEPARATING PACKAGINGS

This claims priority from Italian Application No. 102022000014002, filed Jul. 1, 2022, the disclosure of which is hereby incorporated by reference in its entirety.

FIELD OF THE INVENTION

The present invention relates to a machine for separating packagings.

The invention has been developed with particular regard, though in a non-limiting manner, for a machine for manipulating packagings, particularly for pharmaceuticals, in order to allow one packaging to be removed at a time from a group of packagings arranged in bulk.

Technological Background and Summary

There have existed for some time automatic stores for storing and managing pharmaceuticals, typically inside a pharmacy or a hospital. So that these stores can correctly manage the cataloguing and the insertion of new pharmaceuticals, they need to receive at the inlet the packagings in an organized manner, preferably one at a time. The product supplies typically arrive in boxes, the content of which has to be separated in order to be sorted and conveyed to the store automatically.

There are known different machines which, from a disordered group of packagings, remove them one at a time therefrom. For example, it is known to provide a plurality of transport belts in a cascading manner, each one having a different advance speed, in an increasing manner. In this manner, during the movement between a first belt and a second belt, two packagings which are very close together are slightly spaced apart and the spacing thereof increases with each new transfer between two adjacent transport belts.

A problem of the machines of the known type is that, when two packagings are very near, at the limit completely alongside each other, the known solution is not capable of separating them. In this manner, there will also be two packagings which are placed one beside the other at the outlet from the machinery. This requires the provision of an additional system for overcoming the inevitable errors of the machinery, for example, a vision system which is capable of verifying the presence of several packagings beside each other and a system for removing them from the transport belt. These solutions are naturally complex and costly.

Another problem of the known machines described above is that they are not generally suitable for processing cylindrical packagings, for example, packagings of unguents, cremes, tablets, capsules, etc., because they roll on the transport belts, preventing correct spacing thereof.

There also exist automatic sorting systems which use mechanical arms to grip the packagings one by one. However, they are very expensive and sometimes also slow.

An object of the invention is to solve the problems of the prior art and in particular to provide a more precise and effective machine for separating packagings than the existing ones. Another object is to provide a machine which is also suitable for separating cylindrical packagings. Another object is to provide a mechanically simple device which is reliable to use and which has low installation and maintenance costs.

According to a first aspect, there is described a machine for separating packagings comprising a transport belt which can be inclined longitudinally at a first angle. The longitudinal direction is defined as the direction in which the transport belt transports packagings which are placed thereon. The transport belt may comprise an inlet and an outlet and the inlet is positioned lower than the outlet. The transport belt can be inclined laterally at a second angle. The transport belt may have a first and a second longitudinal side, the first longitudinal side being positioned higher than the second longitudinal side. The transport belt can be provided with a plurality of flights which are arranged near the second longitudinal side.

The transport belt with a double longitudinal and transverse inclination allows the packagings to be separated in a much more effective manner than the one carried out by a planar transport belt or a belt which in any case does not have any lateral inclination because the lateral inclination promotes an alignment of the packagings in a row, in the region of the second longitudinal side.

The longitudinal inclination angle is preferably between 30° and 45°. In this manner, the inclination is sufficient to prevent packagings from being able to be pushed on the transport belt simply by friction on a support plane of the transport belt. At the same time, it is not thereby raised so as to cause rolling of the objects which are positioned on the belt.

The transverse inclination angle is preferably between 5° and 15°. In this manner, the inclination is sufficient to cause the packagings to slide laterally and slowly in order to be able then to be taken by the flights.

According to an aspect, there is described a machine for separating packagings comprising a transport belt which is provided with flights which have a small transverse dimension with respect to a transverse dimension of the transport belt. Preferably, the flights have a small transverse dimension, at least less than ⅓ of the transverse dimension of the transport belt. In this manner, the transport of two juxtaposed packagings is prevented. Furthermore, the transverse dimension of the flight is equal at least to the radius of the greatest cylindrical container which it is desirable to transport. Preferably, each flight has a height, when measured in a perpendicular direction with respect to a support plane which is defined by the transport belt, which is slightly less than the minimum dimension of the box which it is desirable to move.

Preferably, at least one flight has a height greater than the transverse dimension of the flight itself and proportional to the radius of the greatest cylinder which it is desirable to move.

According to another aspect, there is described a machine for separating packagings comprising a transport belt which is provided, in the region of an inlet thereof, with a base wall which is movable with cyclical translational and/or rotational movement.

According to another aspect, there is described a machine for separating packagings comprising a transport belt, wherein the belt may be monolithic. The flights are therefore formed in one piece with the belt itself.

According to another aspect, there is described a machine for separating packagings comprising at least two transport belts which are positioned in a cascading manner with respect to each other.

BRIEF DESCRIPTION OF THE DRAWINGS

Additional features and advantages will be appreciated from the following detailed description of a preferred embodiment of the invention with reference to the appended drawings which are provided purely by way of non-limiting example and in which.

DETAILED DESCRIPTION

Figure 1:
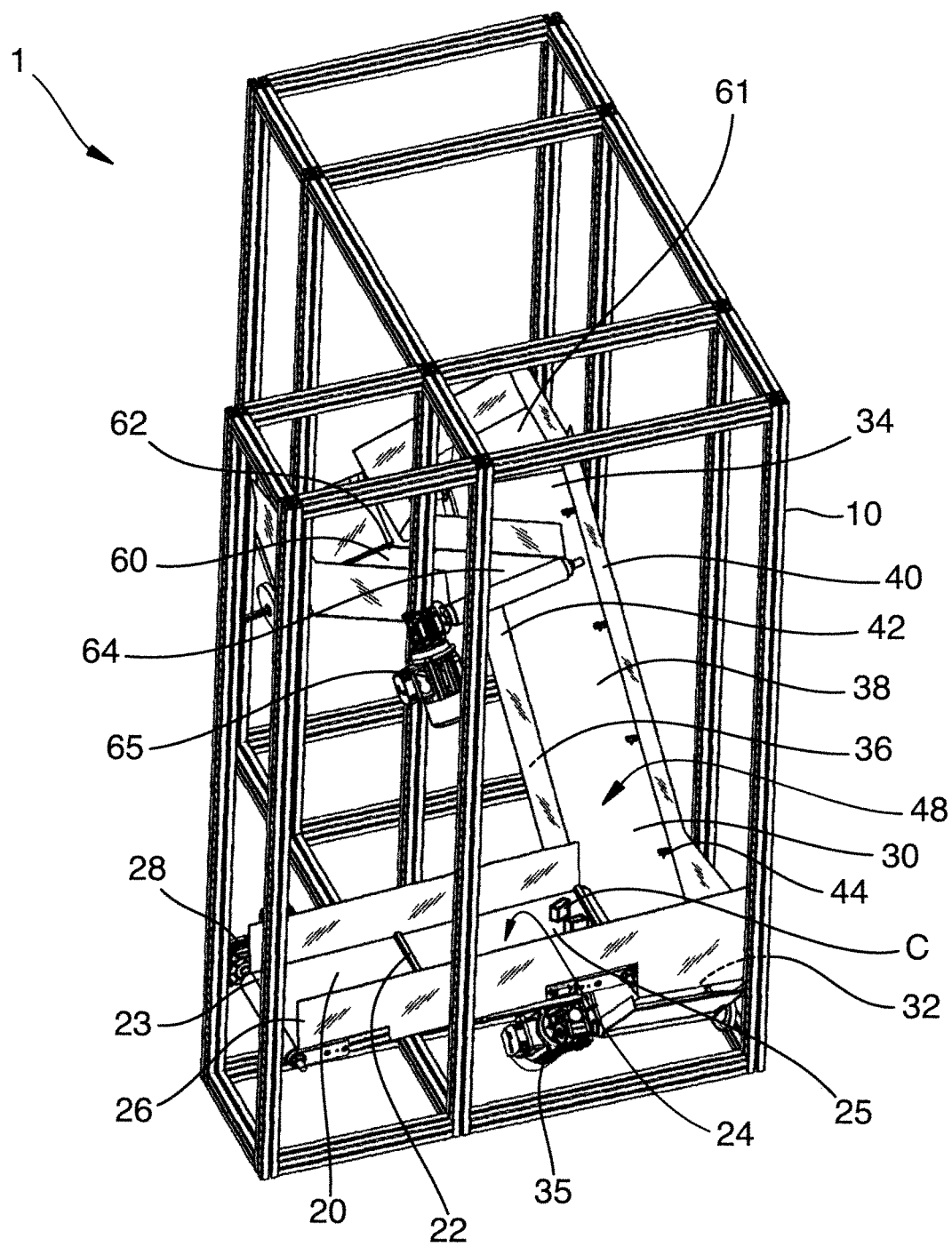
FIG. 1 is a perspective view of a machine for separating packagings.

Now with reference to the drawings, a machine 1 for separating packagings comprises a carrier structure 10, which is schematically depicted in FIG. 1. Transport belts 20, 30 and 60 are fixed to the carrier structure.

A first transport belt 20 is provided for depositing there the packagings C to be separated in bulk. The transport belt 20 is preferably horizontal or slightly inclined longitudinally at an angle α in such a manner that an inlet zone 23 and an outlet zone 25 thereof which are intended to receive packagings C from an operator and to convey packagings to the second transport belt 30, respectively, are located one lower than the other. The angle α is preferably less than 10°.

The first transport belt 20 in the embodiment depicted is provided with a plurality of flights 22, that is to say, gripping elements which project with respect to a support plane 24 which is defined by the transport belt itself. The flights preferably have a transverse dimension which is equal to the width of the transport belt and serve to push forwards the packagings which are located on the transport belt.

In another embodiment Applicant, the first transport belt 20 does not have flights. In this case, the belt preferably has a high friction coefficient and/or has surface irregularities which promote the advance of the boxes.

A pair of lateral edges 26 are provided at the sides of the first transport belt 20 in order to prevent packagings from accidentally falling off the sides of the transport belt itself. A motor 28 actuates the transport belt.

The second transport belt 30 comprises an inlet zone 32 and an outlet zone 34 which are intended to received packagings C from the first transport belt 20 and to convey packagings C to the third transport belt 60, respectively. The second transport belt 30 is actuated by a second motor 35.

Figure 2:
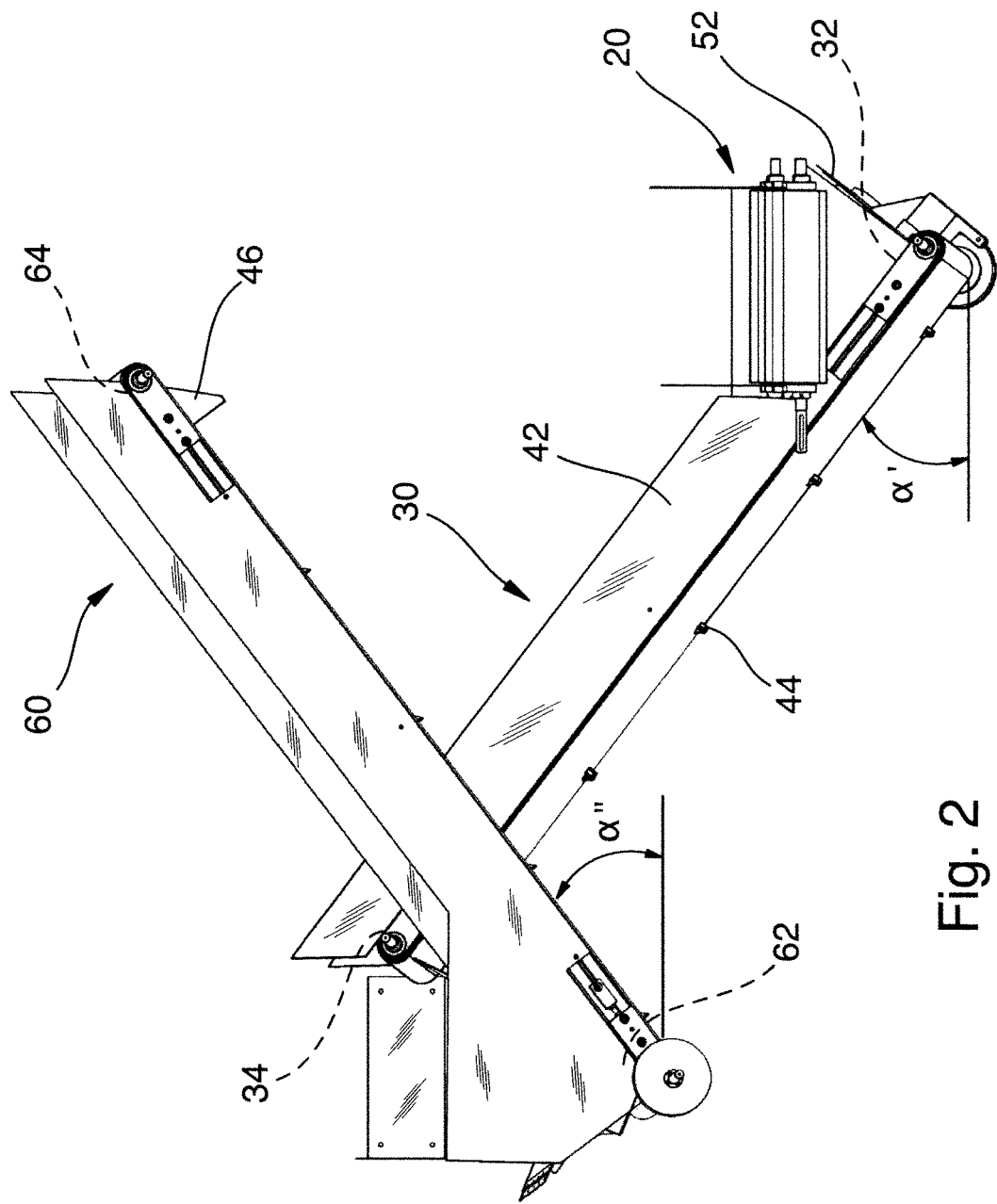
FIG. 2 is a side view of the machine of FIG. 1.
Figure 3:
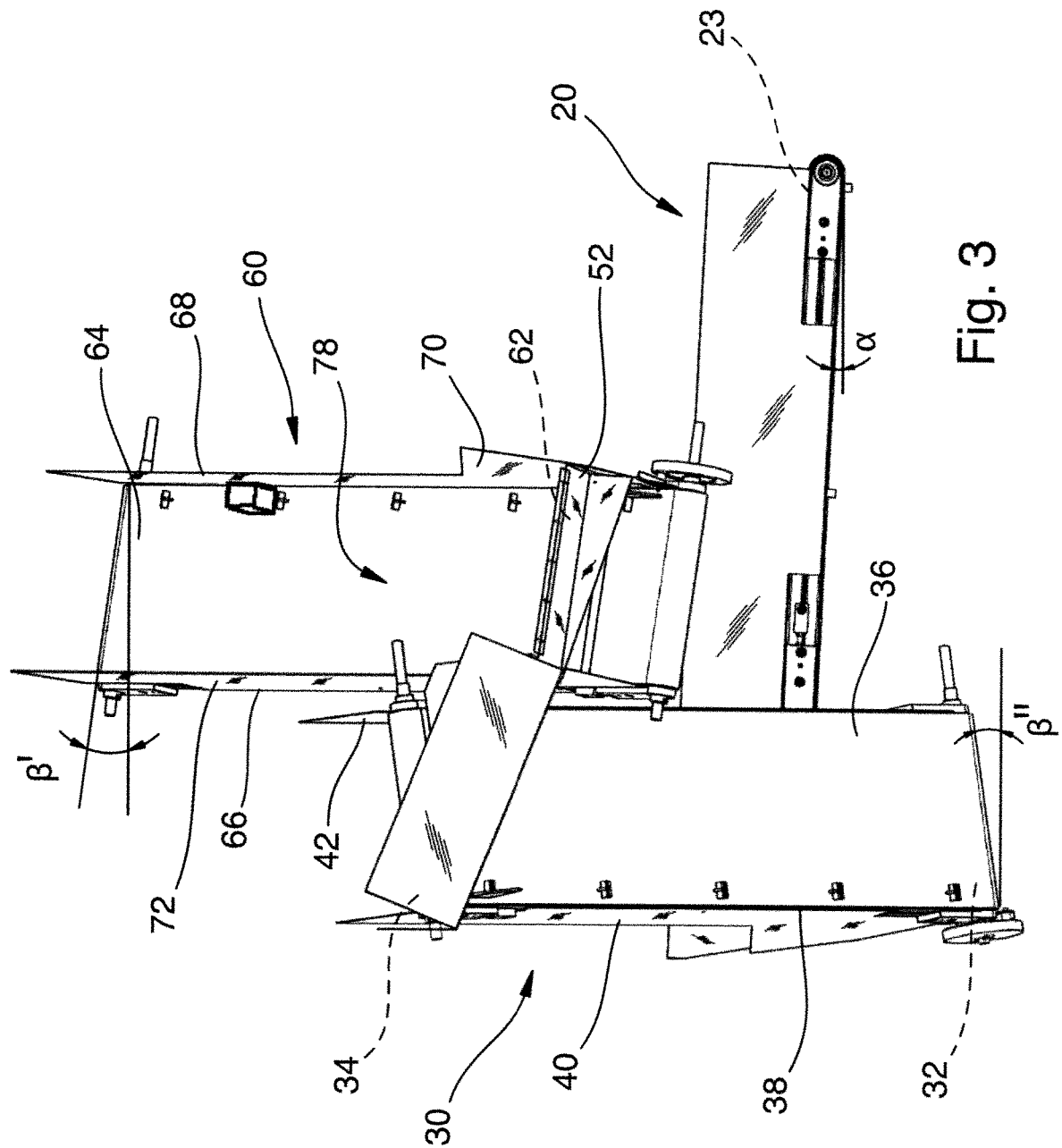
FIG. 3 is a rear view of the machine of FIG. 1.

As can better be seen in FIGS. 2 and 3, in which for the sake of simplicity neither the carrier structure 10 nor the motors which move the transport belts are depicted, the second transport belt is arranged so that the inlet zone 32 is lower than the outlet zone 34. In other words, it is inclined longitudinally at an angle α'. Furthermore, the transport belt is also inclined laterally at a second angle β'; in this manner, a first longitudinal side 36 is positioned higher than a second longitudinal side 38. The longitudinal inclination angle α' is preferably between 30° and 45°. The transverse inclination angle β' is preferably between 5° and 15°.

In order to prevent the risk of the packagings falling, there is preferably provided at least one lateral edge 40 in the region of the longitudinal side 38. Preferably, an additional lateral edge 42 is also provided in the region of the longitudinal side 36.

The second transport belt is provided with a plurality of flights 44, 46 which project with respect to a support plane 48 which is defined by the transport belt 30 itself. The flights 44, 46 have a transverse dimension which is far less than the transverse dimension of the transport belt 30. In particular, they preferably have a width which is a maximum of ⅓ of the width of the transport belt. The transverse dimension of the flight is preferably less than the width of the smallest packaging which it is intended to move in order to reduce to the maximum extent the risk of transporting two packagings alongside each other. The transverse dimension of the flight is at least equal to the radius of the greatest cylindrical container which it is desirable to transport in order to allow the largest packagings also to be moved in an optimum manner.

The height of the flights, which is measured in a perpendicular direction with respect to a support plane which is defined by the transport belt, is slightly less than the minimum dimension of the box which it is desirable to move.

During use, the flights raise the packagings which are positioned in the inlet zone 32 of the second transport belt 30, pushing them towards the outlet 34 and therefore towards the third transport belt 60.

The flights are preferably of two types. A first type of flight 44, which is preferably predominant in terms of numbers, has a height, which is measured in a direction perpendicular to the support plane 48, less than or in any case approximately equal to the width thereof. The flights 44 of the first type are preferably in the shape of a parallelepiped. These flights 44 are arranged near the second longitudinal side 38, that is to say, the lowest longitudinal side, towards which the packagings which are positioned on the transport belt slide, during use, as a result of the effect of the inclination at an angle β.

Figure 4:
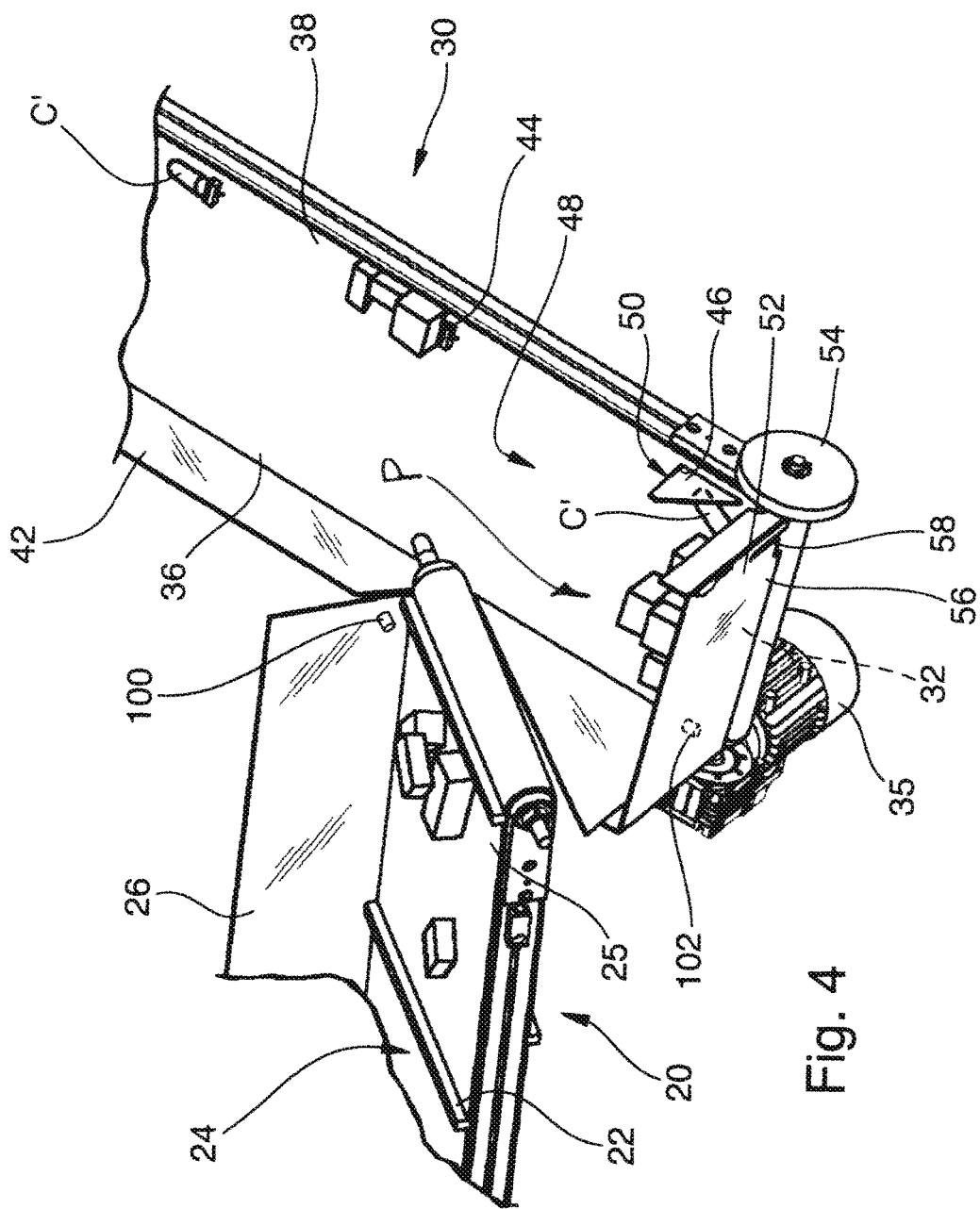
FIG. 4 is a view, drawn to an enlarged scale, of a detail of the lower portion of a first transport belt of the machine of FIG. 1.
Figure 5:
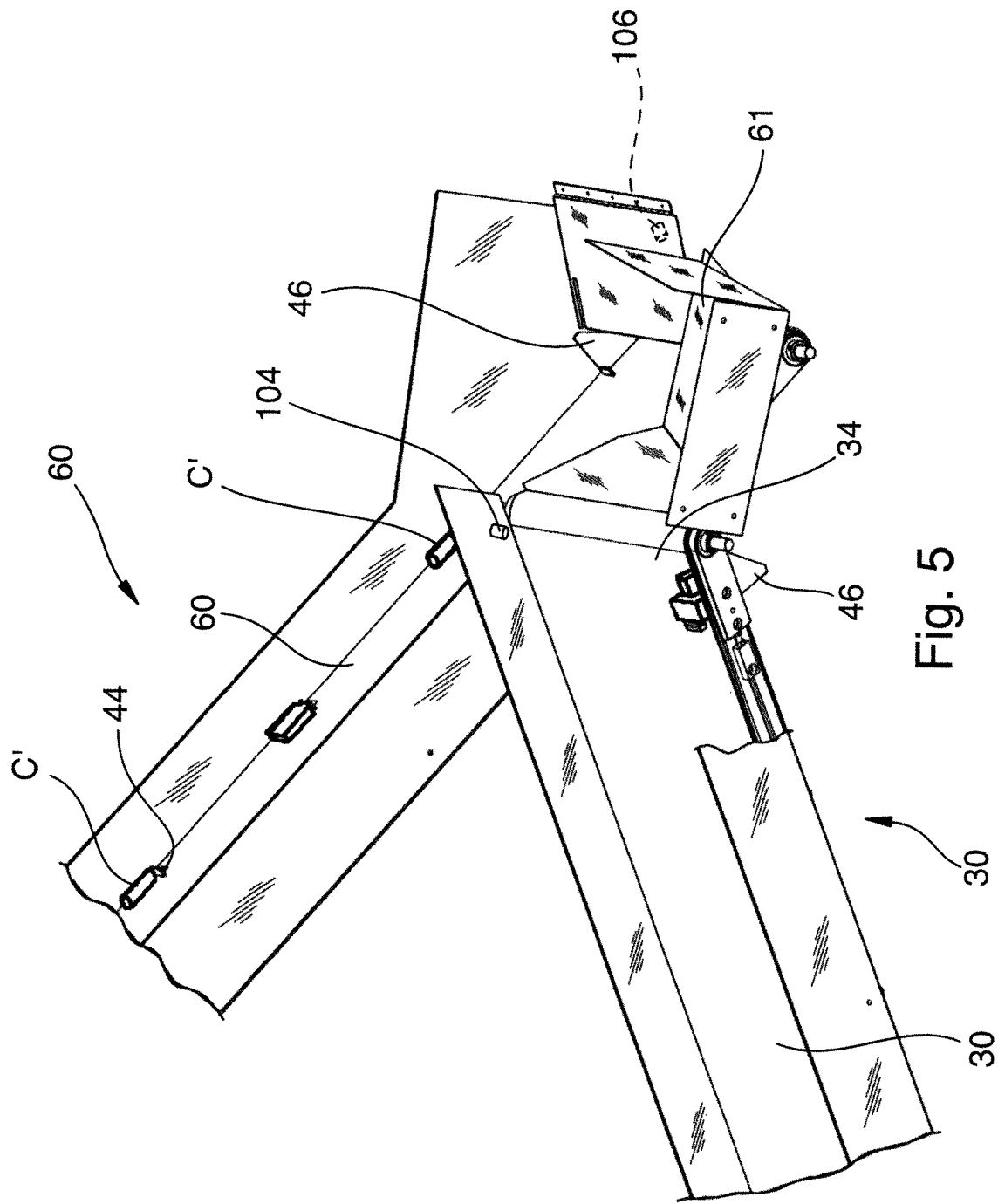
FIG. 5 is a view, drawn to an enlarged scale, of a detail of the upper portion of the first transport belt of the machine of FIG. 1.

A second type of flights 46 according to the depicted embodiment, which can clearly be seen in detail in FIGS. 4 and 5, has a more complex form: there is fixed to a parallelepiped, preferably with a form and dimensions identical to the other flights 44 provided on the belt, a projection which is approximately in the form of a prism with a triangular base and which is orientated so that the two triangular faces are arranged perpendicularly to the support plane 48 of the transport belt 30. Preferably, the triangular faces are in the form of a rectangular or right triangle and are arranged in such a manner that one cathetus is located in the support plane 48 and the other one is directed towards the outlet 34. The flight 46 is anchored to the mat by means of the parallelepiped mentioned above, therefore it is fixedly joined to the web only by a surface which is indicatively equal to that of the flights 44.

More generally, the flights of the second type 46 have a height, which is measured in a direction perpendicular to the support plane 48, which is far greater than the width thereof. Furthermore, they have an edge 50 which is preferably perpendicular to the support plane and which is able to strike, during use, against packagings which are arranged in the inlet zone 32 of the transport belt 30.

Preferably, the web of the transport belt 30 is monolithic, that is to say, the flights are fused to the web itself, not bonded, welded or otherwise fixed. In this manner, the risk of detachment is prevented, with the machine being blocked as a result and repairs being necessary.

In the region of the lower end of the transport belt a movable base wall 52 is provided. In the embodiment depicted, the movable base wall 52 is moved by means of a cam 54. It can be configured so as to move in translation in the advance direction of the transport belt, in both directions. Alternatively, it can be configured to rotate about a horizontal axis, which is parallel with the plane which is defined by the same movable base wall 52, or vertical axis. Furthermore, a rotational translational movement of the movable base wall is not excluded; more generally, the movable base wall 52 is configured in such a manner that a lower portion 56 thereof moves alternately and cyclically in the advance direction of the transport belt 30 and in the opposite direction. The movable base wall 52 has apertures 58 in order to allow the passage of the flights 44, 46.

The third transport belt 60 is positioned in such a manner that the packagings being discharged from the second transport belt 20 are conveyed by means of a chute 61 towards the third transport belt 60.

The third transport belt 60 is generally similar to the second transport belt described above. It comprises an inlet zone 62 and an outlet zone 64 which are intended to receive packagings from the second transport belt 30 and to convey packagings being discharged from the machine, respectively, for the subsequent automated storage operations of the packagings. The third transport belt 60 is actuated by a third motor 65.

The third transport belt is also inclined longitudinally at an angle $\alpha''$. Furthermore, the transport belt is also inclined laterally at a second angle $\beta''$. The longitudinal inclination angle $\alpha''$ is preferably between 30° and °. The transverse inclination angle $\beta''$ is preferably between 5° and 15°. The angles $\alpha''$ and $\beta''$ can be identical to the angles $\alpha'$ and $\beta'$ of the second transport belt 30. As a result of the effect of the lateral inclination, a first longitudinal side 66 is positioned higher than a second longitudinal side 68. Lateral edges 70, 72 are preferably provided at the longitudinal sides 68, 66.

As described above with reference to the second transport belt, the third transport belt is also provided with a plurality of flights 44, 46 which project with respect to a support plane 78 which is defined by the transport belt 60. The flights 44, 46 of the third transport belt are generally similar to the flights 44, 46 of the second transport belt, to the description of which reference may be made.

In the region of the lower end of the transport belt there is provided a movable base wall 52 which is similar to the one described above for the second transport belt 30.

The machine further comprises an asynchronous control system for the transport belts which allows optimization of the charge of packagings on the belts. According to the embodiment depicted, which is provided merely by way of non-limiting example, this control system comprises a plurality of presence detectors, for example, photo-cells, in order to detect the presence of packagings in predetermined positions.

A first pair of presence detectors (FIG. 4) comprises a detector 100 which is positioned in the outlet zone 25 of the first transport belt 20 and a detector 102 which is positioned at the inlet 32 of the second transport belt 30.

During use, if the detector 102 does not detect any presence at the inlet 32 of the second transport belt 30, the first transport belt is actuated by actuating the motor 28 in order to bring a new packaging onto the second transport belt.

If, instead, the detector 102 already detects a presence at the inlet 32 of the second transport belt 30, the first transport belt is actuated only if the detector 101 does not detect any presence at the outlet 24 of the first transport belt 20 in order to bring a new packaging to the outlet 24, ready to be conveyed to the second transport belt as soon as the detector 102 signals the absence of packagings at the inlet 32 of the second transport belt 30.

Similarly, an additional pair of detectors 104, 106 which can be seen in FIG. 5 are provided in the outlet zone 34 of the second transport belt 30 and at the inlet 62 of the third transport belt 60, respectively, with operation which is generally similar to that of the detectors 100, 102.

An additional pair of detectors may also be provided for managing the passage from the third transport belt 60 to a subsequent processing station, which does not form part of the present machine. In this case, a detector may be provided at the outlet from the third transport belt 60 in order to collaborate with a detector which is provided at the inlet to the subsequent processing station.

During use, a plurality of packagings C are deposited, manually or by another machine, on the first transport belt 20. The first transport belt, on the basis of the signals which are detected by the presence detectors 100, 102, is actuated until allowing at least one packaging to fall on the second transport belt 30. If a plurality of packagings are gathered together, as in the example of FIG. 4, often more packagings are allowed to fall together, forming small piles P of packagings on the second transport belt 30.

The movement of the base wall 52, together with the lateral inclination of the transport belt 30, cause the packagings C to slide towards the lateral edge 40. Once in contact with the lateral edge 40, the flights 44 take the packagings.

The flights 46 of the second type are particularly useful on different occasions. Particularly, as can be seen in FIG. 4, they allow cylindrical packagings C' which are arranged with the horizontal axis thereof to be rotated. A horizontal cylindrical packaging could not in fact be collected by a flight 44 or by another conventional flight: because a flat surface which can rest on the flight 44 is not present, during the passage of the flights 44 it passes them but without being urged towards the outlet and actually blocking the machine. When, however, a cylindrical packaging which is arranged with the horizontal axis thereof is struck by a flight 46, the flight rotates it and arranges it so as to have the axis parallel with the longitudinal direction of the transport belt, allowing the subsequent flight 44 to collect it. FIG. 4 shows a cylindrical packaging C' while it is being rotated and another packaging C' is being transported by a flight 44.

In the event that there are stacks P formed by numerous superimposed packages at the entrance 32, with the formation of bridges as well, the flights of the second type 46 allow the packagings which are piled to fall and then proceed to separation.

Then, as a result of the minimal transverse dimensions of the flights 44, 46, it is possible to raise a minimum number of packagings at one time. At most, it may happen to lift a few packagings on top of each other, but hardly two packagings side by side. Two superimposed packagings are subsequently readily separated during the passage from the second transport belt to the third (FIG. 5) because the one positioned above is conveyed to the slide 61 before the one below.

Furthermore, the second and third transport belts are not aligned with each other, but instead parallel and connected by an angled chute. It is precisely the lack of alignment between the second and third transport belts and the particular design of chute 61 that mean that even if two superimposed packagings on the second transport belt were conveyed at the same time to the third transport belt, they would arrive there side by side. Because the third transport belt also has the flights 42 with small transverse dimensions, the separation of a plurality of juxtaposed packagings is immediate and effective.

Naturally, the principle of the invention remaining the same, the forms of embodiment and details of construction may be varied widely with respect to those described and illustrated, without thereby departing from the scope of the invention.

For example, the description is given with particular reference to packagings of pharmaceuticals, but naturally the machine is also suitable for separating other packagings or, more generally, rigid products.

The invention claimed is:

1. A machine for separating packagings, the machine comprising a transport belt inclined longitudinally at a first angle and laterally at a second angle so that a first longitudinal side is positioned higher than a second longitudinal side, the machine further comprising a plurality of flights arranged adjacent the second longitudinal side of the transport belt and the flights have a transverse dimension less than a transverse dimension of the transport belt.

2. The machine according to claim 1, wherein the first angle is between 30° and 45°.

3. The machine according to claim 1, wherein the second angle is between 5° and 15°.

4. The machine according to claim 1, wherein the transport belt is monolithic.

5. The machine according to claim 1, further comprising an additional transport belt positioned in a cascading manner with respect to the transport belt.

6. A machine for separating packagings, the machine comprising a transport belt inclined longitudinally at a first angle and laterally at a second angle so that a first longitudinal side is positioned higher than a second longitudinal side, the machine further comprising a plurality of flights arranged adjacent the second longitudinal side of the transport belt, and at least one flight of the plurality of flights has a height, when measured in a perpendicular direction with respect to a support plane defined by the transport belt, greater than a transverse dimension of the at least one flight.

7. The machine according to claim 6, wherein the first angle is between 30° and 45°.

8. The machine according to claim 6, wherein the second angle is between 5° and 15°.

9. The machine according to claim 6, wherein the transport belt is monolithic.

10. The machine according to claim 6, further comprising an additional transport belt positioned in a cascading manner with respect to the transport belt.

11. A machine for separating packagings, the machine comprising a transport belt inclined longitudinally at a first angle and laterally at a second angle so that a first longitudinal side is positioned higher than a second longitudinal side, the machine further comprising a plurality of flights arranged adjacent the second longitudinal side of the transport belt, and a base wall movable with cyclical translational and/or rotational movement, the base wall being disposed at an inlet of the transport belt.

12. The machine according to claim 11, wherein the first angle is between 30° and 45°.

13. The machine according to claim 11, wherein the second angle is between 5° and 15°.

14. The machine according to claim 11, wherein the transport belt is monolithic.

15. The machine according to claim 11, further comprising an additional transport belt positioned in a cascading manner with respect to the transport belt.

* * * * *